Clark L. Huff
Bruce E. Huff
INVENTORS

Clark L. Huff
Bruce E. Huff  INVENTORS

United States Patent Office 3,444,674
Patented May 20, 1969

3,444,674
FENCE CLEANER
Clark L. Huff, P.O. Box 819, Kimball, Nebr. 69145, and Bruce E. Huff, N. Rte., Box 84A, Dix, Nebr. 69133
Filed Aug. 4, 1966, Ser. No. 570,190
Int. Cl. A01d 35/26, 55/18, 49/00
U.S. Cl. 56—25.4
6 Claims

ABSTRACT OF THE DISCLOSURE

An upstanding rotary shaft journaled from one side of a support therefor adapted to move along one side of a fence of the type including spaced posts interconnected by a vertically spaced generally horizontal members extending between adjacent posts and disposed generally in the same vertical plane. At least one elongated and generally radially outwardly projecting flexible arm member is carried by the shaft for rotation therewith and includes an outer end portion swingable through a circular path including a fully exposed unshrouded segment thereof disposed outwardly of the side of the support from which the shaft is journaled and which may be disposed on the side of the vertical plane of the fence remote from the side of the fence along which the support is moving.

---

This invention relates to a novel and useful fence cleaner and more specifically to a fence cleaner designed primarily for the purpose of cutting down vegetation growing up along both sides of a fence of the type including spaced upright posts interconnected by means of vertically spaced and generally horizontal members extending between adjacent posts of the fence.

In many localities barbed wire fences of the type including upstanding horizontally spaced posts and vertically spaced strands of barbed wire extending between adjacent posts are utilized to define certain field areas, either individual field areas or boundary lines between adjacent field areas.

When this type of fence constuction, as well as other types of fence construction, is utilized to define a boundary line of a field, vegetation in the form of unwanted weeds and the like grows up along the fence on both sides thereof. Although such weed vegetation is tolerable in some instances, in most instances it is undesirable. However, such vegetation is difficult to cut or mow by conventional moving machinery because of the adjacent fence construction and therefore such weed vegetation must be cut by hand if its removal is desired.

Accordingly, it is the main object of this invention to provide a mechanical fence cleaner which will be operative to cut down weed vegetation and the like growing alongside a barbed wire fence as well as other similiar types of fences.

Another object of this invention, in accordance with the immediately preceding object, is to provide a fence cleaner which will be operative to traverse one side of a fence and cut down the weed vegetation on that side of the fence and also the weed vegetation growing up adjacent the other side of the fence.

Still another object of this invention is to provide a fence cleaner adapted specifically to be partially supported from and propelled by an ordinary piece of farm equipment such as a farm tractor thereby enabling the fence cleaner to be readily utilized in conjunction with existing equipment.

A still further object of this invention is to provide a fence cleaner in accordance with the preceding objects and adapted to be partially suported from and propelled by a farm tractor in a manner such that extreme lateral maneuverability of the weed cutting portions of the fence cleaner will be afforded by the operator of the propelling tractor.

A final object of this invention to be specifically enumerated herein is to provide a fence cleaner which will conform to conventional forms of manufacture, be of simple construction and easy to use so as to provide a device that will economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
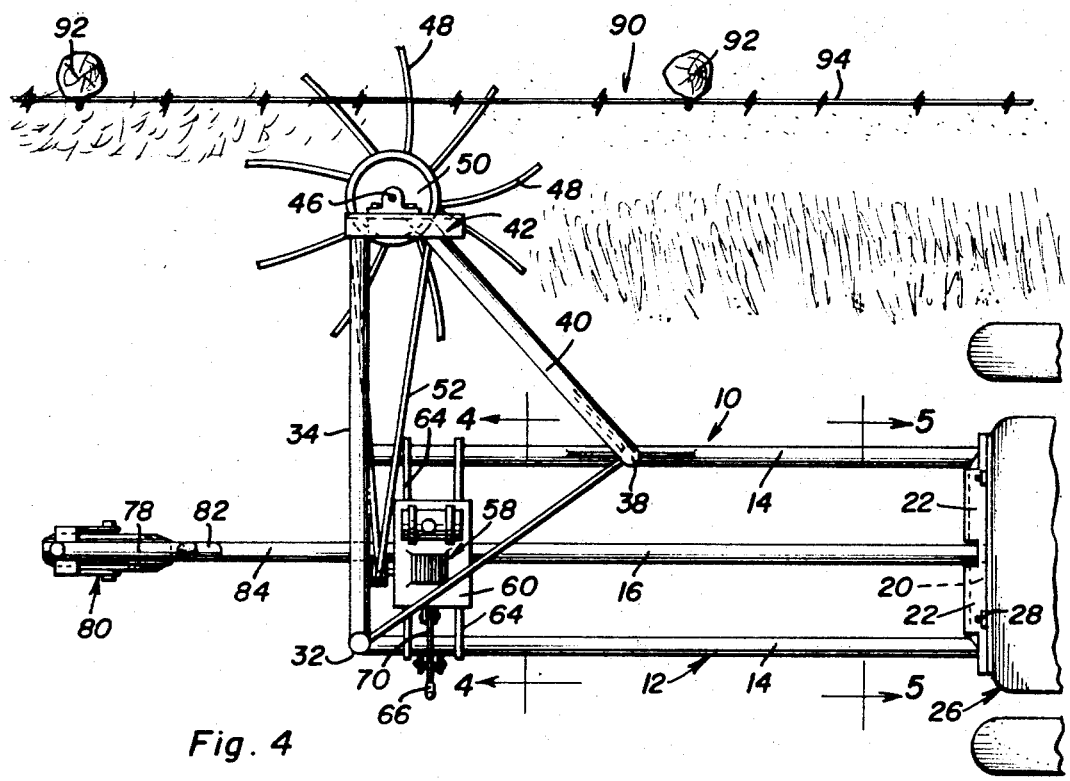
FIGURE 1 is a top plan view of the fence cleaner of the instant invention illustrated operatively associated with a propelling farm tractor and a barbed wire fence having weed-type vegetation growing up along both sides thereof.
Figure 4:
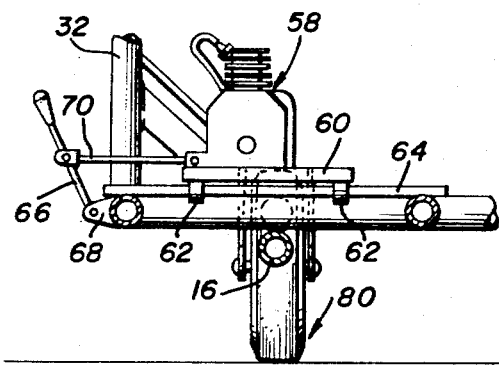
FIGURE 4 is an enlarged fragmentary transverse vertical sectional view taken substantially upon the plane indicated by the section line 4—4 of FIGURE 1.
Figure 5:
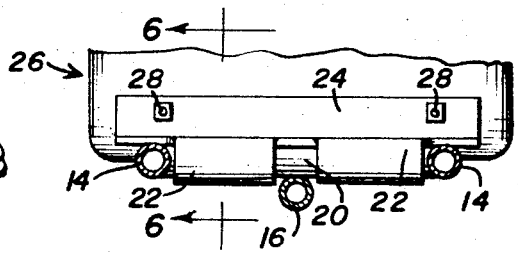
FIGURE 5 is an enlarged fragmentary transverse vertical sectional view taken substantially upon the plane indicated by the section line 5—5 of FIGURE 1.
Figure 6:
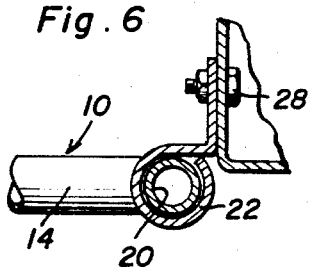
FIGURE 6 is an enlarged fragmentary longitudinal vertical sectional view taken substantially upon the plane indicated by the section line 6—6 of FIGURE 5.

Referring now more specifically to the drawings, the numeral 10 generally designates the fence cleaner of the instant invention including a main frame generally referred to by the reference numeral 12 provided with a pair of longitudinally extending opposite side members 14 and a center longitudinally extending member 16. The rear ends of the members 14 are interconnected by means of a rear transverse member 20 journaled in a pair of sleeve journals 22 supported from a mounting bracket 24 is secured to the forward portion of a farm tractor generally referred to by the reference numeral 26 by means of suitable fasteners 28.

The forward ends of the frame members 14 are interconnected by means of a transversely extending and laterally outwardly projecting lower forward transverse member 30 and the left forward corner of the frame 12 includes an upright 32 whose lower end is secured to the adjacent end of the member 30. The frame 12 additionally includes an upper transverse and laterally outwardly directed member 34 spaced above and generally paralleling the member 30 and an inclined brace 36 is secured between the upright 32 and the member 34. In addition, the frame 12 includes a second upright 38 whose lower end is secured to the right hand longitudinal member 14 intermediate its front and rear ends and a pair of upper and lower forwardly and outwardly inclined members 40 have their innermost rear ends secured to the upper end of the upright 38 and the side of the right hand frame member 14 adjacent the lower end of the upright 38. An upper journal block assembly generally referred to by the reference numeral 42 is secured between the forward end of the upper member 40 and the adjacent end of the upper member 34 and a lower journal block assembly generally referred to by the reference numeral 44 is secured between the forward outer end of the lower member 40 and the adjacent end of the lower member 30.

A driven shaft 46 is rotatbly journaled from the journal block assemblies 42 and 44 and includes a plurality of vertically and circumferentially spaced and radially outwardly projecting arm members 48. In addition, the driven shaft 46 has a driven pulley 50 mounted thereon for rotation therewith and the driven pulley 50 is driven by means of an endless flexible belt 52 entrained thereabout and also about a drive pulley 54 supported on the output shaft 56 of an internal combustion engine generally referred to by the reference numeral 58 supported from the frame 12.

The internal combustion engine 58 is suitably secured to a mounting base or plate 60 and two pairs of aligned sleeve journals 62 are dependingly supported from the plate 60 and are slidably disposed on a pair of mounting rods 64 secured to and extending between the upper surfaces of the members 14. Accordingly, it may be seen that the internal combustion engine 58 is mounted for adjustable sliding movement transversely of the frame 12 whereby the endless flexible belt 52 may be utilized as a clutching mechanism. A positioning level 66 is pivotally supported from the frame 12 as at 68 and is operatively connected to the internal combustion engine 58 by means of a connecting link 70 and may be utilized to vary the tension of the belt 52.

The center longitudinal member 16 of the frame 12 has its rear end secured to the undersurface of the center portion of the transverse member 20 and the forward end of the center member 16 passes beneath the transverse member 30 and has a pair of forwardly and upwardly inclined bracing plates 76 secured to opposite side portions of its forward terminal end portion. The upper ends of the forwardly and upwardly inclined braces or bracing plates 76 are secured to opposite side portions of a forwardly projecting support arm 78 from whose forward extremity a depending and vertically adjustable dirigible-type ground engaging wheel assembly generally referred to by the reference numeral 80 is supported. The rear end of the support arm 78 is secured to the upper end of a forwardly and upwardly inclined brace 82 whose lower end is secured to the forward extremity of a supplemental center longitudinal frame member 84 having its rear end secured to the transverse member 30 centrally intermediate the opposite side members 14. Further, the frame member 84 has its underside secured to the upper side of the forward terminal end portion of the frame member 16.

Figure 2:
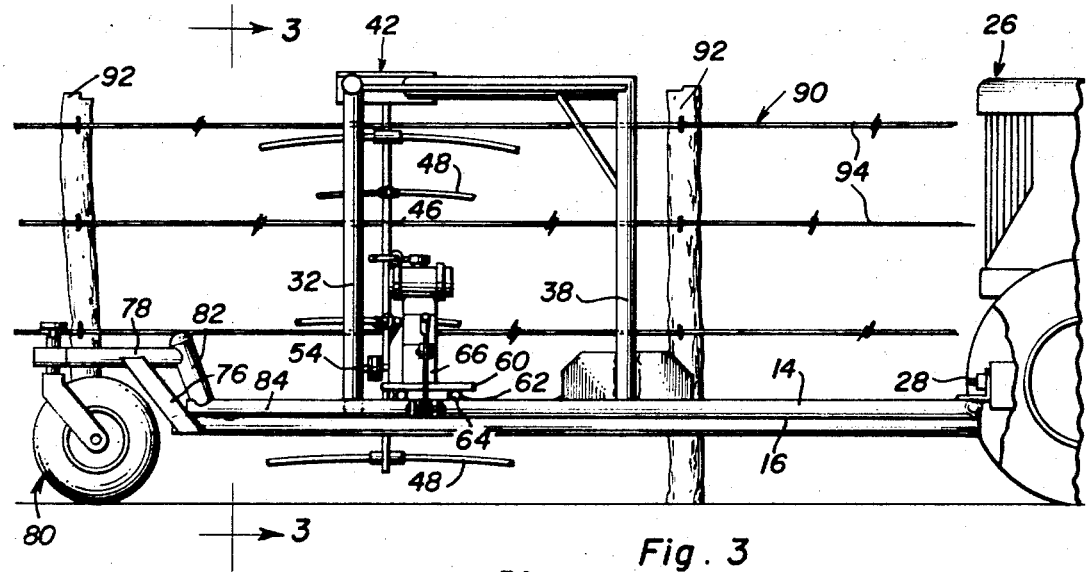
FIGURE 2 is a side elevational view of the assemblage illustrated in FIGURE 1.
Figure 3:
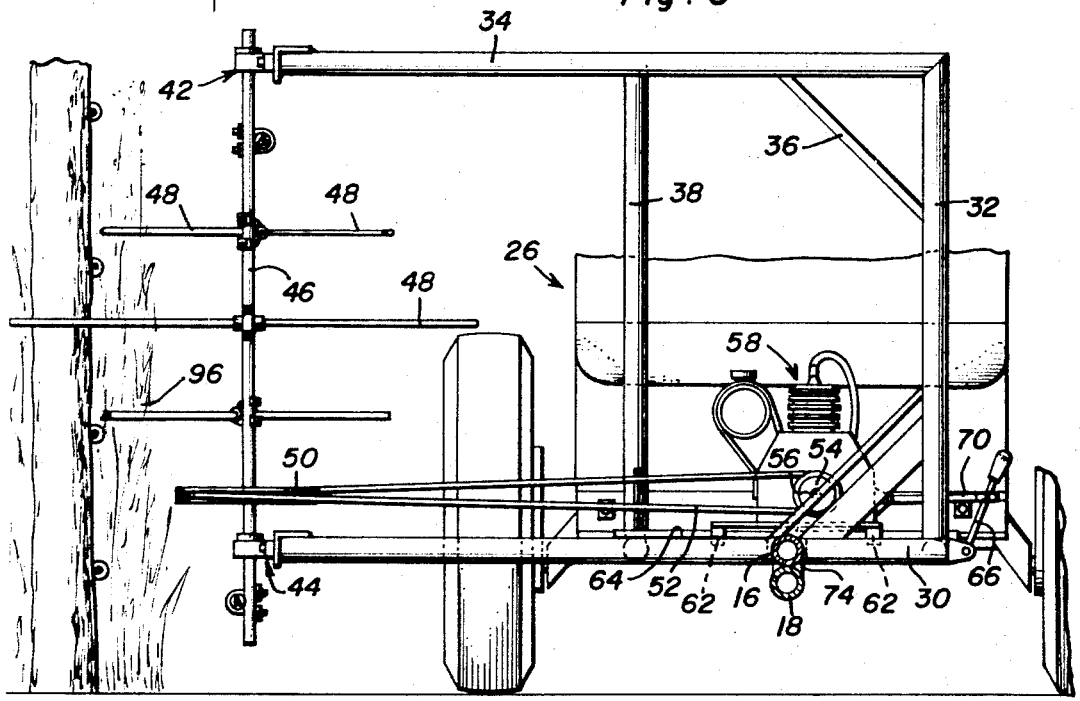
FIGURE 3 is an enlarged fragmentary transverse vertical sectional view taken substantially upon the plane indicated by the section line 3—3 of FIGURE 2.

With attention now invited more specifically to FIGURES 1-3 of the drawings there may be seen a fence construction generally referred to by the reference numeral 90 including a plurality of upright posts 92 between which a plurality of generally horizontal and vertically spaced strands 94 of barbed wire are strung. The fence 90 has upstanding weed-type vegetation 96 growing up along both sides thereof and the machine 10, with the shaft 46 being powered by the internal combustion engine 58 and the frame 12 being supported from and driven by the tractor 26, is adapted to cut down the vegetation 96 on both sides of the fence 90 upon the machine 10 transversing only one side of the fence 90. Upon movement of the machine 10 alongside one side of the fence 90 and rotation of the shaft 46, the arm members 48, which may conveniently comprise cut sections of relatively stiff but resilient fan belt material, will pass between the vertically spaced strands 94 of barbed wire and impact with the vegetation 96 on both sides of the fence 90 so as to cut the vegetation. As the resilient arm members 48 impact with one of the posts 92, they will of course yield and thus not be unduly damaged. Of course, the resilient arm members 48 may be replaced by more rigid members, it being understood that a slight lateral movement of the forward end of the tractor 26 during steering movements thereof will effect accentuated similar lateral movements of the shaft 46 and thereby enable the spinning arm members 48 of the machine 10 to be quickly moved out of the way whenever a fence post 92 is encountered. However, in order to avoid the necessity of accurate steering of the tractor 26, the arm members 48 are preferably constructed of resilient material so that they may yield upon contact with the posts 92.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fence cleaner adapted to clear unwanted vegetation from adjacent a fence of the type including spaced posts interconnected by vertically spaced generally horizontal members extending between adjacent posts and disposed generally in the same vertical plane, said fence cleaner having one side adapted to oppose and be moved along one side of said fence, said cleaner including a journaled upstanding driven shaft, said shaft including at least one elongated generally radially outwardly projecting arm member whose outer end portion, upon rotation of said shaft, swings through a circular path disposed in a generally horizontal plane and including a fully exposed unshrouded outer segment thereof disposed outwardly of said one side of said cleaner and adapted to be positionable on the side of said plane remote from said cleaner during movement of said fence cleaner along said fence to impact with and cut vegetation growing up along both side of said fence.

2. The combination of claim 1 wherein said upstanding shaft includes a plurality of generally radially outwardly projecting arm members spaced longitudinally therealong.

3. The combination of claim 1 wherein said upstanding shaft includes a plurality of generally radially outwardly projecting arm members spaced longitudinally therealong, and circumferentially thereabout.

4. The combination of claim 1 wherein said cleaner includes an elongated frame, said shaft being journaled from one end of said frame, said one end of said frame including dirigible depending ground engaging support wheel means, the other end of said frame being adapted to be pivotally secured to a forward portion of a pusher vehicle for rotation about a generally horizontal axis extending transversely of said frame and pusher vehicle and with said segment disposed outwardly of a vertical plane containing the outermost projecting portion of said vehicle on the side thereof corresponding to said one side of said cleaner.

5. The combination of claim 4 including motor means supported from said frame and drivingly connected with said shaft.

6. The combination of claim 5 wherein said motor means includes and adjustable slip clutch type of driving connection with said shaft.

References Cited

UNITED STATES PATENTS

| | | | |
|---|---|---|---|
| 2,976,664 | 3/1961 | Monroe | 56—25.4 |
| 3,070,938 | 1/1963 | Winget | 56—6 |
| 3,135,079 | 6/1964 | Dunn | 56—6 |
| 3,156,082 | 11/1964 | Joyner | 56—295 |
| 3,236,034 | 2/1966 | Blettner | 56—25.4 XR |
| 3,303,637 | 2/1967 | Wixson | 56—295 |

ANTONIO F. GUIDA, *Primary Examiner.*

U.S. Cl. X.R.

56—295, 503